United States Patent
Zander et al.

(10) Patent No.: US 8,450,411 B2
(45) Date of Patent: May 28, 2013

(54) CURABLE COMPOSITION HAVING A SILANE-MODIFIED REACTIVE THINNER

(75) Inventors: Lars Zander, Rommerskirchen (DE); Rolf Tenhaef, Duesseldorf (DE); Johann Klein, Duesseldorf (DE); Martin Majolo, Erkelenz (DE); Thomas Tamcke, Duesseldorf (DE); Thomas Bachon, Duesseldorf (DE); Jens Lückert, Barsinghausen (DE); Thomas Plantenberg, Hinwil (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/316,935

(22) Filed: Dec. 12, 2011

(65) Prior Publication Data
US 2012/0108730 A1 May 3, 2012

Related U.S. Application Data

(63) Continuation of application No. PCT/EP2010/059230, filed on Jun. 29, 2010.

(30) Foreign Application Priority Data

Jun. 30, 2009 (DE) .................. 10 2009 027 333

(51) Int. Cl.
*C08L 83/00* (2006.01)
*C08G 18/42* (2006.01)

(52) U.S. Cl.
USPC ......................................... 524/506; 524/500

(58) Field of Classification Search
USPC ....................................................... 524/506
See application file for complete search history.

(56) References Cited

U.S. PATENT DOCUMENTS

| | | | |
|---|---|---|---|
| 4,514,315 A | | 4/1985 | Matulewicz et al. |
| 4,723,026 A | * | 2/1988 | Cloetens et al. ............... 556/444 |
| 6,207,766 B1 | * | 3/2001 | Doi et al. ..................... 525/403 |
| 2008/0051517 A1 | * | 2/2008 | Okai et al. .................... 525/227 |

FOREIGN PATENT DOCUMENTS

| | | |
|---|---|---|
| EP | 0 162 588 | 10/1991 |
| EP | 0 520 426 | 4/1996 |
| EP | 0 918 062 | 2/2004 |
| EP | 1 396 513 | 7/2005 |
| EP | 1 731 549 | 12/2006 |

OTHER PUBLICATIONS

International Search Report issued in connection with International Patent Application No. PCT/EP2010/059230 mailed on Dec. 22, 2010.

* cited by examiner

*Primary Examiner* — Hui Chin
(74) *Attorney, Agent, or Firm* — James E. Piotrowski; Steven C. Bauman

(57) ABSTRACT

A solvent-free and anhydrous hardenable composition that contains at least one polymer A. Polymer A being obtainable by reacting a polyether with at least one ethylenically unsaturated silane in the presence of a radical starter, the ethylenically unsaturated silane carrying at least one hydrolyzable group on the silicon atom. The composition provides low viscosity prior to curing along with good elasticity after curing and a broad adhesion spectrum in a solvent-free and water-free hardenable composition. Also methods for producing the composition and use of the composition as an adhesive, sealant, or coating agent.

13 Claims, No Drawings

CURABLE COMPOSITION HAVING A SILANE-MODIFIED REACTIVE THINNER

The present invention relates to the field of the curable compositions such as those utilized, for example, in adhesives, sealants, and coating materials. The invention relates in particular to compositions to which at least one silyl-functionalized polymer is added, and proposes specific such polymers. The invention further relates to a method for manufacturing the compositions, and to their use as an adhesive, sealant, or coating material.

Polymer systems that possess reactive silyl groups are known. In the presence of atmospheric moisture, polymers that possess silyl groups having hydrolyzable substituents are capable, even at room temperature, of condensing with one another with release of the hydrolyzed residues. Depending on the concentration of silyl groups having hydrolyzable substituents, and on the configuration of those silyl groups, what forms in this context are principally long-chain polymers (thermoplastics), relatively wide-mesh three-dimensional networks (elastomers), or highly crosslinked systems (thermosetting plastics).

The polymers generally comprise an organic backbone that carries at the ends, for example, alkoxy- or acyloxysilyl groups. The organic backbone can involve, for example, polyurethanes, polyesters, polyethers, etc. These kinds of $\alpha,\omega$-silane-substituted polymers are often notable for excellent flexibility and cohesion.

Polymers that contain statistically distributed silyl groups have also been described. These polymers are often based on polyacrylates as base elements, and are used to improve adhesion properties.

Polymers having silyl groups at the termini or in a side chain are described, for example, in EP 1 396 513 B1. The silyl groups comprising hydrolyzable substituents are, according to the document, introduced by addition of a hydrosilane to terminal double bonds of the backbone polymer, by a reaction of isocyanatosilanes with hydroxyl groups of the polymer, by reacting silanes containing active hydrogen atoms with isocyanate-functionalized polymers, or by reaction of mercaptosilanes with terminal double bonds of the polymer. The polymers are a constituent of compositions that are used as adhesives or sealants.

The same methods for introducing reactive silyl groups into polymers are also described in EP 0 918 062 B1. In addition, curable compositions based on such polymers contain, according to this document, a further polymer that can result inter alia from the polymerization of vinyl silanes.

U.S. Pat. No. 4,514,315 describes compositions to inhibit the corrosion of aluminum, which in addition to water and/or alcohol contain polyethers that are modified by radically initiated reactions with alkenylsilanes. The molecular weights of the underlying polyethers are between 200 and 100,000. The compositions are provided, for example, for use as an additive for cooling fluids in vehicles.

In the context of the manufacture of hardenable compositions based on functionalized polymers, one challenge is to keep the viscosity of the compositions low enough to ensure good handling characteristics resp. processability and to prevent sedimentation phenomena. This can be achieved by the addition of plasticizers or solvents, but they are often objectionable in terms of health and can also degrade the material properties of the cured composition in terms of evaporation or migration after curing.

Another approach is taken, for example, in EP 0 162 588 B1. This patent describes the introduction of polymeric side strands resp. graft chains into polyether polyols that are provided for further processing into polyurethanes. For this purpose, polyether polyols are reacted with olefinic monomers in the presence of radical starters. Vinylsilanes having reactive silyl groups are not mentioned. A stabilizer that results from the reaction of polyols with tri- or tetrafunctionalized silanes is additionally used. The polyether polyols generated in this fashion produce steric hindering between the chain strands, and in that way counteract the agglomeration of polymer particles. According to the examples provided, dispersions of the grafted polyether polyols have viscosities between 2000 and 5500 mPas. Adhesion properties resp. properties of cured compositions are not evident from EP 0 162 88.

A continuing demand therefore exists for easily handled compositions that meet all the demands placed on a modern adhesive, sealant, or coating material. An object of the present invention is therefore to make available compositions having the lowest possible viscosity, that possess a high degree of flexibility and extensibility once curing is complete, and that are moreover notable for a broad adhesion spectrum.

The manner in which the object is achieved is evident from the basic idea of the invention: to add polyether-based silane-modified reactive diluents to the compositions.

A first subject of the present invention is therefore a solvent-free and anhydrous hardenable composition that contains at least one polymer A, polymer A being obtainable by reacting a polyether with at least one ethylenically unsaturated silane in the presence of a radical starter, the ethylenically unsaturated silane carrying at least one hydrolyzable group on the silicon atom.

A "composition" is understood in the context of the present invention as a mixture of at least two components, one of which is the polymer A that is at least contained. Further possible constituents of a composition according to the present invention will be discussed later in the present text. The term "hardenable" is to be understood to mean that at least polymer A is capable, under the influence of external conditions, in particular under the influence of moisture present in and/or deliberately introduced into the environment, of crosslinking with other polymer molecules by means of a chemical reaction of the reactive groups present in the polymer, and thereby transitioning from a plastically deformable state into a harder state. Crosslinking can in general occur as a result of chemical and/or physical influences, i.e., alongside moisture as previously mentioned, also e.g. by the delivery of energy in the form of heat, light, or other electromagnetic radiation, but also by simply bringing the composition into contact with air or a reactive component.

The term "solvent-free and anhydrous" is defined in the context of the present invention to mean that water or solvents are not deliberately added to the composition, but may be present in low concentrations as a contaminant or as a constituent carried in with the components of the composition. An upper limit of 5 wt %, based on the total weight of the composition, is defined for the total quantity of water and solvents.

The term "solvents" is understood to mean inorganic or organic liquids that are capable of dissolving other gaseous, liquid, or solid substances. This embraces in particular the organic solvents known to one skilled in the art, for example alcohols (methanol, ethanol, propanols, butanols, octanols, cyclohexanol), glycols (ethylene glycol, diethylene glycol), ethers and glycol ethers (diethyl ether, dibutyl ether, anisole, dioxan, tetrahydrofuran, mono-, di-, tri-, polyethylene glycol ethers), ketones (acetone, butanone, cyclohexanone), esters (acetic acid esters, glycol esters), amides and other nitrogen compounds (dimethylformamide, pyridine, N-methylpyrrolidone, acetonitrile), sulfur compounds (carbon disulfide, dimethyl sulfoxide, sulfolane), nitro compounds (nitrobenzene), halocarbons (dichloromethane, chloroform, tetrachloromethane, tri-, tetrachlorethane, 1,2-dichlorethane, chlorofluorocarbons), hydrocarbons (naphthas, petroleum ethers, cyclohexane, methylcyclohexane, decalin, terpene-L, benzene, toluene, xylenes). The term "solvent" of course does not, for purposes of the present invention, cover the silane-modified polyethers A expressly identified as a constituent of the composition according to the present invention.

A "polyether" is understood for purposes of the present invention as a polymer whose repeating units are held together by C—O—C ether functionalities. Polymers having lateral ether groups, such as cellulose ethers, starch ethers, and vinyl ether polymers, as well as polyacetals, are therefore not covered by this definition.

The polyether on which polymer A is based is preferably a polyalkylene oxide, particularly preferably polyethylene oxide and/or polypropylene oxide.

Polyethers have a flexible and elastic structure with which compositions that have outstanding elastic properties can be manufactured. Polyethers are not only flexible in their backbone, but also at the same time strong. For example, polyethers (in contrast to e.g. polyesters) are not attacked or decomposed by water and bacteria.

The molecular weight $M_n$ of the polyether on which polymer A is based is by preference equal to 2000 to 100,000 g/mol (daltons), the molecular weight being equal particularly preferably to at least 6000 g/mol, and in particular at least 8000 g/mol. Molecular weights of at least 2000 g/mol are advantageous for the polyethers of the present invention because compositions according to the present invention based on polyethers having this minimum molecular weight exhibit significant film-forming properties.

Particularly advantageous viscoelastic properties can be achieved if polyethers that possess a narrow molecular weight distribution, and thus a low polydispersity, are used. These can be manufactured, for example, by so-called double metal cyanide (DMC) catalysis. Polyethers manufactured in this fashion are notable for a particularly narrow molecular weight distribution, a high average molecular weight, and a very small number of double bonds at the ends of the polymer chains.

In a specific embodiment of the present invention, the maximum polydispersity PD ($M_w/M_n$) of the polyether on which polymer A is based is therefore equal to 3, particularly preferably 1.7, and very particularly preferably 1.5.

The "molecular weight $M_n$" is understood as the number-average molecular weight of the polymer. This, like the weight-average molecular weight $M_w$, can be determined by gel permeation chromatography (GPC, also called SEC). This method is known to one skilled in the art. The polydispersity is derived from the average molecular weights $M_w$ and $M_n$. It is calculated as PD=$M_w/M_n$.

The ratio $M_w/M_n$, also referred to as "polydispersity," indicates the breadth of the molecular weight distribution and thus the differing degrees of polymerization of the individual chains in polydisperse polymers. For many polymerizates and polycondensates, the applicable polydispersity value is approximately 2. Strict monodispersity would exist for a value of 1. A low polydispersity (for example, less than 1.5) indicates a comparatively narrow molecular weight distribution and thus the specific expression of properties associated with molecular weight, for example viscosity. The polyether on which polymer A is based therefore has in the context of the present invention, in particular, a polydispersity ($M_w/M_n$) of less than 1.3.

An "ethylenically unsaturated silane" is understood as a non-polymeric silicon compound in which at least one silicon atom is connected by chemical bonding to at least one organic residue that comprises a carbon-carbon double bond (C═C).

A "hydrolyzable group" is understood in the context of the present invention as a substituent that can be converted into a hydroxy group (OH) by reacting with water. Hydrolyzable groups are to be understood in particular as alkoxy groups (also referred to as alkyloxy groups) and acyloxy groups.

Polymer A is preferably obtainable by reacting a polyether with at least one ethylenically unsaturated silane of the general formula (I)

$$R^1R^2C{=}C(R^3){-}R^4{-}SiXYZ \qquad (I)$$

in which $R^1$, $R^2$, and $R^3$ are identical or different and denote, mutually independently, a hydrogen atom or an alkyl group having 1 to 6 carbon atoms, $R^4$ denotes a chemical bond (to be understood here as a single bond) or a divalent organic group containing 1 to 10 atoms selected from carbon, oxygen, and nitrogen, and X, Y, and Z are identical or different; at least two of the substituents X, Y, and Z are, mutually independently, a methoxy, ethoxy, propyloxy, or butyloxy group; and the remaining substituent is one of the alkoxy groups listed previously, an alkyl group having 1 to 6 carbon atoms, an alkenyl group having 2 to 6 carbon atoms, or an alkenyloxy group having 2 to 6 carbon atoms.

Very particularly preferably, $R^4$ denotes a chemical bond.

In general, alkoxy groups, in particular methoxy, ethoxy, n-propyloxy, isopropyloxy, n-butyloxy, and isobutyloxy groups are selected by preference as hydrolyzable groups on the silicon atom. This is advantageous because compositions containing alkoxy groups do not, upon curing, release any substances that irritate the mucous membranes. The alcohols that are formed are harmless in the quantities released, and evaporate. Such compositions are therefore particularly suitable for homeowner use. Acyloxy groups, for example an acetoxy group —O—CO—CH$_3$, can, however, also be used as hydrolyzable groups.

The ethylenically unsaturated silane is particularly preferably selected from the group made up of vinyltrimethoxysilane, vinyltriethoxysilane, vinyldimethoxymethylsilane, vinyldiethoxymethylsilane, trans-β-methylacrylic acid trimethoxysilylmethyl ester, and trans-β-methylacrylic acid trimethoxysilylpropyl ester.

In general, polymers that contain di-resp. trialkoxysilyl groups possess highly reactive linking sites that enable rapid curing, high degrees of crosslinking, and therefore good final strength values. A further advantage of such alkoxy-group-containing polymers is that alcohols are formed upon curing under the influence of moisture; these are harmless in the quantities released, and evaporate.

The particular advantage of dialkoxysilyl groups is that the corresponding compositions are, after curing, more elastic, softer, and more flexible than systems containing trialkoxysilyl groups. They are therefore particularly suitable for use as sealants. They furthermore release even less alcohol during curing, and are therefore of particular interest when the quantity of alcohol released needs to be reduced.

With trialkoxysilyl groups, on the other hand, a higher degree of crosslinking can be achieved, which is particularly advantageous if a harder, more solid substance is desired after curing. Trialkoxysilyl groups are moreover more reactive, i.e. crosslink more quickly, and thus may decrease the quantity of catalyst required; and they have advantages in terms of "cold flow," i.e. the dimensional stability of a corresponding adhesive under the influence of force and, if applicable, temperature.

Compounds having alkoxysilyl groups have different levels of reactivity in the context of chemical reactions depending on the nature of the alkyl residues on the oxygen atom. Among the alkoxy groups, the methoxy group exhibits the greatest reactivity. Silyl groups of this kind can thus be resorted to when particularly rapid curing is desired. Higher aliphatic residues, such as ethoxy, already produce a lower reactivity in the terminal alkoxysilyl group as compared with methoxy groups, and can be used advantageously to implement graduated crosslinking rates.

Interesting configuration capabilities are also offered by combinations of the two groups. If methoxy is selected for X and ethoxy for Y within the same alkoxysilyl group, for example, the desired reactivity in the terminating silyl groups can adjusted with particular precision, if silyl groups carrying exclusively methoxy groups are felt to be too reactive, and the silyl groups carrying ethoxy groups too sluggish, for the intended purpose.

In addition to methoxy and ethoxy groups, larger residues (which, naturally have lower reactivity) can of course also be used as hydrolyzable groups. This is of interest in particular when delayed curing is desired, for example in the context of adhesives that are still intended, even after application, to enable shifting of the bonded surfaces with respect to one another in order to arrive at final positions.

Polymer A is obtainable, according to the present invention, by reacting a polyether with at least one ethylenically unsaturated silane that carries at least one hydrolyzable group on the silicon atom, in the presence of a radical starter. The reaction is preferably carried out in such a way that the ethylenically unsaturated silane and the radical starter are added to the polyether, or to a mixture of the polyethers, at temperatures of more than 50° C., particularly preferably more than 70° C., and in particular more than 90° C. A reaction under such conditions causes, as best understood, addition of the silane to radically initiated reactive sites in the polyether chain whose location cannot be controlled. Polymer(s) A preferably comprise(s) silyl groups having at least one hydrolyzable group on the silicon atom in a statistical distribution.

The viscosity of each polymer A contained in the composition according to the present invention is by preference equal to between 300 and 50,000 mPas, particularly preferably between 500 and 20,000 mPas, and in particular between 600 and 10,000 mPas, very particularly between 700 and 7000 mPas (measured in each case per Brookfield, 23° C., spindle 7, 100 rpm). Polymer(s) A thus has/have very low viscosity levels. Polymer A thus serves as a reactive diluent in a composition according to the present invention. A "reactive diluent" is understood as a component that reduces the viscosity of the as-yet uncured composition, but is incorporated into the crosslinked structure during curing by chemical reaction.

Polymer A is obtainable preferably by reacting a polyether with 1 to 50 wt %, more greatly preferably with 3 to 25 wt % ethylenically unsaturated silane, based in each case on the weight of the polyether.

The polymer(s) A obtainable by reacting a polyether with at least one ethylenically unsaturated silane that carries at least one hydrolyzable group on the silicon atom, in the presence of a radical starter, is/are preferably contained in a composition according to the present invention at a weight proportion from 5 to 25 wt %, particularly preferably from 10 to 20 wt %, based in each case on the total weight of the composition.

A composition according to the present invention can contain one or more polymer(s) A as a sole component capable of crosslinking. In a preferred embodiment, however, a composition according to the present invention additionally contains one or more polymer(s) B terminated with at least one reactive silyl group, polymer B not being identical to a polymer A. Polymer B is by preference an alkoxy- and/or acyloxysilane-terminated polymer having at least one terminal group of the general formula (II)

-A$_n$-R—SiXYZ  (II), in which
A is a divalent bonding group,
R is a divalent hydrocarbon radical, optionally containing a heteroatom, having 1 to 12 carbon atoms, and
X, Y, Z, mutually independently, are $C_1$ to $C_8$ alkyl, $C_1$ to $C_8$ alkoxy, or $C_1$ to $C_8$ acyloxy residues, at least one of the residues being a $C_1$ to $C_8$ alkoxy or $C_1$ to $C_8$ acyloxy group, and
n is 0 or 1.

A "divalent" (or bivalent) bonding group A is understood in this context as a divalent chemical group that links the polymer skeleton of the alkoxy- or acyloxysilane-terminated polymer to residue R of the terminal group. The divalent bonding group A can be formed, for example, in the context of manufacture of the alkoxy- or acyloxysilane-terminated polymer, for example as a urethane group by the reaction between a polyether functionalized with hydroxy groups, and an isocyanatosilane. The divalent bonding group A can be both distinguishable and indistinguishable from structural features occurring in the underlying polymer skeleton. The latter case exists, for example, when it is identical to the linkage points of the repeating units of the polymer skeleton.

Variable n is 0 or 1, i.e. the divalent bonding group A links the polymer backbone to residue R (n=1), or the polymer skeleton is connected or linked directly to residue R (n=0).

Residue R is a divalent hydrocarbon radical, optionally containing a heteroatom, having 1 to 12 carbon atoms. Oxygen (O) or nitrogen (N) can, for example, be contained as a heteroatom. The hydrocarbon residue can be, for example, a straight-chain or branched or cyclic, substituted or unsubstituted alkylene residue. The hydrocarbon radical can be saturated or unsaturated.

X, Y, and Z in the general formula (II) are, mutually independently, $C_1$ to $C_8$ alkyl, $C_1$ to $C_8$ alkoxy, or $C_1$ to $C_8$ acyloxy residues. At least one of the residues X, Y, Z must be a hydrolyzable group, i.e. a $C_1$ to $C_8$ alkoxy group resp. residue or a $C_1$ to $C_8$ acyloxy group resp. residue. Alkoxy groups, in particular methoxy, ethoxy, propyloxy, and butyloxy groups, are by preference selected as hydrolyzable groups.

The alkoxy- and/or acyloxysilane-terminated polymer B preferably comprises at least two terminal groups of the general formula (II). Each polymer chain thus contains at least two linking sites at which condensation of the polymers can take place in the presence of atmospheric moisture, with release of the hydrolyzed residues. A controlled and rapid crosslinking capability is achieved in this fashion, so that adhesive bonds with good strength can be obtained. In addition, embodiment of the achievable network as a long-chain system (thermoplastics), relatively wide-mesh three-dimensional network (elastomers), or highly crosslinked system (thermosetting plastics) can be controlled by way of the quantity and structure of the hydrolyzable groups (e.g. use of di- or trialkoxysilyl groups, methoxy groups, or longer residues, etc.), so that the elasticity, flexibility, and high-temperature strength, among other characteristics, of the completely crosslinked compositions can thereby be influenced.

In polymer B, preferably X is an alkyl group and Y and Z are an alkoxy group, or X, Y, and Z are an alkoxy group.

Particularly preferably, in a group of the general formula (II), X, Y, and Z are, mutually independently in each case, a methyl, an ethyl, a methoxy, or an ethoxy group. Methoxy and ethoxy groups, being comparatively small hydrolyzable groups having a low steric demand, are highly reactive and thus enable rapid curing even when little catalyst is used. They are therefore of interest in particular for systems in which rapid curing is desired, for example in the case of adhesives that are intended to exhibit high initial adhesion. An embodiment in which X, Y, and Z are a methyl or methoxy group is particularly preferred.

In a terminal group of the general formula (II), R is by preference a hydrocarbon residue having 1 to 6 carbon atoms. The curing rate of the composition can be influenced via the length of the hydrocarbon residues that form the bonding member between the polymer skeleton and silyl residue, thereby offering a further capability for configuring the composition according to the present invention.

R in the general formula (II) is, in particular, a methylene, ethylene, or propylene residue. Methylene and n-propylene residues are used with particular preference. Alkoxysilane-terminated compounds having a methylene group as a bonding member to the polymer skeleton (so-called α-silanes) exhibit particularly high reactivity in the terminating silyl group, which results in shortened setting times and thus to very rapid curing of formulations based on such polymers.

In general, a lengthening of the connecting hydrocarbon chain results in decreased reactivity of the polymers. The γ-silanes in particular (which contain the unbranched propylene residue as a bonding member) exhibit a balanced relationship between necessary reactivity (acceptable curing times) and delayed curing (open time, possibility for correction once bonding has occurred).

The curing rate of the systems can be influenced as desired by deliberately combining α- and γ-alkoxysilane-terminated modules.

In the general formula (II), A is preferably an amide, carbamate, urea, imino, carboxylate, carbamoyl, amidino, carbonate, sulfonate, or sulfinate group, or an oxygen or nitrogen atom. The bonding group A can be formed in the context of manufacture of the silyl-terminated polymers, by reacting the skeleton polymer with a reactive component that carries the —R—SiXYZ sequence. Group A can be both distinguishable and indistinguishable from structural features occurring in the underlying polymer skeleton. The latter case exists, for example, when it is identical to the linkage points of the repeating units of the polymer skeleton. In this case n would correspond to a value of 0. If bonding group A is distinguishable from the linkage groups in the polymer skeleton, n corresponds to a value of 1.

Several methods are described in the existing art for linking a reactive silyl group to a polymer skeleton. One that may be mentioned is polymerization of unsaturated monomers with ones that, for example, comprise alkoxysilyl groups. One monomer of the latter kind suitable for this would be, for example, vinyltrimethoxysilane. A further method is grafting of unsaturated monomers, such as e.g. vinyltrimethoxysilane, onto thermoplastics, for example onto polyethylene. Also widely utilized is hydrosilylation, the addition of H-silanes, such as e.g. methyldimethoxysilane, to carbon-carbon double bonds with noble-metal catalysis. This method causes the residue containing the terminal silyl group to be linked directly, i.e. without a further bonding group, to the polymeric backbone (n=0 in formula (I)).

Particularly preferred as a bonding group A in the general formula (II) are urethane and urea groups, which can be obtained by reacting specific functional groups of a prepolymer with an organosilane that carries a further functional group. Urethane groups can be produced, for example, either when the polymer skeleton contains terminal hydroxy groups and when isocyanatosilanes are used as a further component, or when, conversely, a polymer that comprises terminal isocyanate groups is reacted with an alkoxysilane containing terminal hydroxy groups. Urea groups can be obtained in similar fashion when a terminal primary or secondary amino group (on either the silane or the polymer), which reacts with a terminal isocyanate group present in the respective reaction partner, is used. This means that a reaction is brought about either between an aminosilane and a polymer comprising terminal isocyanate groups, or between an isocyanatosilane and a polymer terminally substituted with an amino group. Urethane and urea groups advantageously increase the strength of the polymer chains and of the entire crosslinked polymer, since they can form hydrogen bonds.

The alkoxy- or acyloxysilane-terminated polymer B preferably comprises a backbone that is selected from the group of polyurethanes, polyethers, polyesters, polyacrylates, poly (meth)acrylates, polyacrylamides, poly(meth)acrylamides, polyvinyl esters, polyolefins, alkyd resins, phenol resins, vinyl polymers, styrene-butadiene copolymers, and copolymers of one or more of the aforesaid backbones. Essential properties of the composition according to the present invention, such as e.g. viscosity and elasticity, but also resistance to environmental influences, can be determined by the selection and specific configuration of the polymer classes used for the backbone.

Polyacrylates, polyurethanes, and polyesters, as well as polyethers, are particularly preferably used for constructing the backbone.

The use of polyurethanes and polyesters opens up a wide variety of application possibilities, since very different mechanical properties can be achieved with both polymer classes depending on the selection and stoichiometric ratios of the initial substances. Polyesters can furthermore be decomposed by water and bacteria, and are therefore of interest for applications in which biodegradability is important.

Polymers that contain polyethers as a backbone possess a flexible and elastic structure not only at the terminal groups but also in the polymer spine. Compositions that exhibit excellent elastic properties can be manufactured therewith. Polyethers are not only flexible in their framework, but also at the same time strong. For example, they are not attacked or decomposed by water and bacteria.

In the context of the present invention, polyethers based on polyethylene oxide and/or polypropylene oxide are used with particular preference for reasons of availability.

The alkoxy- and/or acyloxysilane-terminated polymer B preferably has a molecular weight $M_n$ from 4000 to 100,000, by preference 8000 to 50,000, particularly preferably 10,000 to 30,000, in particular 15,000 to 25,000 g/mol. The "molecular weight $M_n$" is understood as the number-average molecular weight of the polymer. This, like the weight-average molecular weight $M_w$, can be determined by gel permeation chromatography (GPC). A method of this kind is known to one skilled in the art.

The molecular weights indicated are particularly advantageous because a balanced relationship between viscosity (easy processability), strength, and elasticity can be obtained in the corresponding compositions using such polymers. This combination is expressed very advantageously in a molecular weight range from 12,000 to 20,000, in particular from 14,000 to 18,000.

The ratio $M_w/M_n$ in polymer B is by preference less than 1.5 in the context of the present invention. Particularly preferably, the alkoxy- and/or acyloxysilane-terminated polymer B has a polydispersity ($M_w/M_n$) of less than 1.3.

A "radical starter" is understood as a compound that, after thermal or photochemical (preferably thermal) excitation, decomposes into radicals and can thereby start radical reactions. Preferred radical starters in the context of the present invention are azobis(isobutyronitrile) (AIBN) and/or peroxides such as, for example, benzoyl peroxide and/or dicumyl peroxide. Particularly preferably, dicumyl peroxide is used.

A composition according to the present invention can also contain, alongside the aforesaid silylated polymers, further adjuvants and additives that can impart to it improved elastic properties, improved recovery capability, sufficiently long processing time, a fast curing time, and low residual tack. Included among these adjuvants and additives are adhesion promoters, catalysts, and plasticizers, as well as fillers.

The compositions can furthermore contain stabilizers, antioxidants, reactive diluents, drying agents, UV stabilizers, aging protection agents, rheological adjuvants, color pigments or color pastes, fungicides, or flame retardants as additional additives.

A "plasticizer" is understood as a substance that decreases the viscosity of the compositions and thus facilitates processability.

The plasticizer is preferably selected from a fatty acid ester, a dicarboxylic acid ester, an ester of OH-group-carrying or epoxidized fatty acids, a fat, a glycolic acid ester, a phthalic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer, and a chlorinated paraffin, as well as mixtures of two or more thereof. Targeted selection of one of these plasticizers, or of a specific combination, can result not only in a decrease in viscosity and thus better processability, but also in further advantageous properties of the composition according to the present invention, e.g. the gelling capability of the polymers, low-temperature elasticity resp. low-temperature strength, or even antistatic properties.

Suitable from the group of the phthalic acid esters, for example, are dioctyl phthalate, dibutyl phthalate, diisoundecyl phthalate, diisononyl phthalate, or butylbenzyl phthalate; of the adipates, dioctyl adipate, diisodecyl adipate, also diisodecyl succinate, dibutyl sebacate, or butyl oleate.

Of the polyether plasticizers, it is preferred to use endcapped polyethylene glycols, for example polyethylene or polypropylene glycol di-$C_{1-4}$ alkyl ethers, in particular the dimethyl or diethyl ethers of diethylene glycol or dipropylene glycol, as well as mixtures of two or more thereof.

Also suitable as plasticizers are, for example, esters of abietic acid, butyric acid esters, acetic acid esters, propionic acid esters, thiobutyric acid esters, citric acid esters, and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Düsseldorf).

The pure or mixed ethers of monofunctional, linear or branched $C_{4-16}$ alcohols, or mixtures of two or more different ethers of such alcohols, for example dioctyl ethers (obtainable as Cetiol OE, Cognis Deutschland GmbH, Düsseldorf), are also suitable as plasticizers.

Likewise suitable in the context of the present invention as plasticizers are diurethanes, which can be manufactured e.g. by reacting diols having OH terminal groups with monofunctional isocyanates, by selecting the stoichiometry so that substantially all the free OH groups react completely. Any excess isocyanate can then be removed from the reaction mixture, for example, by distillation. A further method for manufacturing diurethanes involves reacting monofunctional alcohols with diisocyanates, such that all the NCO groups react as completely as possible.

The composition according to the present invention contains a reactive diluent in the form of polymer(s) A. A viscosity of the composition according to the present invention that is still too high for specific applications can also be decreased in simple and useful fashion by adding a further reactive diluent, without resulting in demixing phenomena (e.g. plasticizer migration) in the cured substance.

This further reactive diluent preferably comprises at least one functional group that reacts after application, for example, with moisture or with atmospheric oxygen. Examples of such groups are silyl groups, isocyanate groups, vinyl-unsaturated groups, and polyunsaturated systems.

The viscosity of the reactive diluent is preferably equal to less than 20,000 mPas, particularly preferably approximately 0.1 to 6000 mPas, very particularly preferably 1 to 1000 mPas (Brookfield RVT, 23° C., spindle 7, 10 rpm).

The following substances can be used, for example, as reactive diluents: polyalkylene glycols reacted with isocyanatosilanes (e.g. Synalox 100-50B, Dow), alkyltrimethoxysilane, alkyltriethoxysilane, such as methyltrimethoxysilane, methyltriethoxysilane, and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methylcarbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of these compounds.

The composition according to the present invention can furthermore encompass an adhesion promoter. An "adhesion promoter" is understood as a substance that improves the adhesion properties of adhesion layers onto surfaces.

Usual adhesion promoters (tackifiers) known to one skilled in the art can be used, alone or as a combination of multiple compounds. Resins, terpene oligomers, coumaron/indene resins, aliphatic petrochemical resins, and modified phenol resins are, for example, suitable. Suitable in the context of the present invention are, for example, hydrocarbon resins such as those obtained by the polymerization of terpenes, chiefly α- or β-pinenes, dipentenes, or limonenes. Polymerization of these monomers is generally performed cationically, with initiation using Friedel-Crafts catalysts. Also included among the terpene resins, for example, are copolymers of terpenes and of other monomers, for example styrene, α-methylstyrene, isoprene, and the like. The aforesaid resins are utilized, for example, as adhesion promoters for contact adhesives and coating materials. Also suitable are the terpene-phenol resins that are produced by acid-catalyzed addition of phenols to terpenes or colophon. Terpene-phenol resins are soluble in most organic solvents and oils, and are miscible with other resins, waxes, and rubber. Also suitable in the context of the present invention as adhesion promoters in the aforementioned sense are the colophon resins and derivatives thereof, for example esters or alcohols thereof.

Silane adhesion promoters, in particular aminosilanes, are particularly well suited.

In a further preferred embodiment of the hardenable composition according to the present invention, the composition encompasses as an adhesion promoter a silane of the general formula (III)

$$R'R''N-R^5-SiXYZ \qquad (III)$$

in which

R' and R", mutually independently, are hydrogen or $C_1$ to $C_8$ alkyl residues, $R^5$ is a divalent hydrocarbon, optionally containing a heteroatom, having 1 to 12 carbon atoms, and X, Y, Z, mutually independently, are $C_1$ to $C_8$ alkyl, $C_1$ to $C_8$ alkoxy, or $C_1$ to $C_8$ acyloxy residues, at least one of the residues being a $C_1$ to $C_8$ alkoxy or $C_1$ to $C_8$ acyloxy group. Compounds of this kind naturally have a high affinity for the bonding polymer components of the hardenable composition according to the present invention, but also for a broad spectrum of both polar and nonpolar surfaces, and therefore contribute to the formation of particularly stable adhesion between the adhesive composition and the particular substance being adhesively bonded.

The $R^5$ bonding group can be, for example, a straight-chain or branched or cyclic, substituted or unsubstituted alkylene residue. The $R^5$ bonding group is preferably an n-propylene residue or a methylene residue.

A crosslinking catalyst, which can also be referred to as a "hardening catalyst," is preferably contained as a further constituent in a hardenable composition according to the present invention. Suitable crosslinking catalysts for controlling the hardening rate of the hardenable compositions according to the present invention are, for example, organometallic compounds such as iron compounds or tin compounds, in particular the 1,3-dicarbonyl compounds of iron, such as iron(III) acetylacetonate, or of divalent resp. tetravalent tin, for example dibutyltin bisacetylacetonate, the dialkyltin(IV) dicarboxylates (e.g. dibutyltin di laurate, dibutyltin maleate, or dibutyltin diacetate) or the corresponding dialkoxylates, e.g. dibutyltin dimethoxide. The organotin compounds specifically are well-tested and easily accessible catalysts with excellent activity. Some tin organyls, however, have come under criticism because of physiological and environmental objections. The composition according to the present invention is therefore, in a further specific embodiment, tin-free. The compositions according to the present invention can nevertheless be cured effectively and quickly, without loss of quality, using alternative catalysts.

Boron halides such as boron trifluoride, boron trichloride, boron tribromide, boron triiodide, or mixed boron halides can be used alternatively as hardening catalysts. Boron trifluoride complexes such as, for example, boron trifluoride diethyl etherate (CAS no. [109-63-7]), which as liquids are more easily handled than the gaseous boron halides, are particularly preferred.

Also suitable as a catalyst for the composition according to the present invention is 1,8-diazabicyclo-[5.4.0]-undec-7-ene (DBU).

In addition, compounds of titanium, aluminum, and zirconium, or mixtures of one or more catalysts from one or more of the groups just mentioned, can be used as catalysts. One the one hand it is thereby possible to avoid the use of tin compounds; on the other hand, better adhesion to organic surfaces (for example, acrylates), which normally adhere poorly, can thereby be achieved. Among the titanium, aluminum, and zirconium catalysts, the titanium catalysts are preferred for use because the best curing results are obtained with them.

Compounds that comprise hydroxy groups and/or substituted or unsubstituted alkoxy groups are suitable as titanium catalysts, i.e. titanium alkoxides of the general formula $$Ti(OR^z)_4$$

where $R^z$ is an organic group, by preference a substituted or unsubstituted hydrocarbon group having 1 to 20 carbon atoms, and the four $-OR^z$ alkoxy groups are identical or different. One or more of the $-OR^z$ residues can also be replaced by $-OCOR^z$ acyloxy groups.

Also suitable as titanium catalysts are titanium alkoxides in which one or more alkoxy groups are replaced by halogen atoms.

The following mixed-substituted or non-mixed-substituted titanium alkoxides can be used, for example, as titanium catalysts:

tetramethoxytitanium, tetraethoxytitanium, tetraallyloxytitanium, tetra-n-propoxytitanium, tetraisopropoxytitanium, tetra-n-butoxytitanium, tetraisobutoxytitanium, tetra-(2-butoxy)titanium, tetra(t-butoxy)titanium, tetrapentoxy(titanium), tetracyclopentoxytitanium, tetrahexoxytitanium, tetracyclohexoxytitanium, tetrabenzoxytitanium, tetraoctoxytitanium, tetrakis(2-ethylhexoxy)titanium, tetradecoxytitanium, tetradodecoxytitanium, tetrastearoxytitanium, tetrabutoxytitanium dimer, tetrakis(8-hydroxyoctoxy)titanium, titanium diisopropoxy-bis(2-ethyl-1,3-hexanediolate), titanium bis(2-ethylhexyloxy) bis(2-ethyl-1,3-hexanediolate), tetrakis(2-chloroethoxy) titanium, tetrakis(2-bromoethoxy)titanium, tetrakis(2-methoxyethoxy)titanium, tetrakis(2-ethoxyethoxy) titanium, butoxytrimethoxytitanium, dibutoxydimethoxytitanium, butoxytriethoxytitanium, dibutoxydiethoxytitanium, butoxytriisopropoxytitanium, dibutoxydiisopropoxytitanium, tetraphenoxybutane, tetrakis(o-chlorophenoxy)titanium, tetrakis(m-nitrophenoxy)titanium, tetrakis(p-methylphenoxy)titanium, tetrakis(trimethylsiloxy)titanium.

Titanium acylates can also be used: triisopropoxytitanium, triisopropoxytitanium methacrylate, diisopropoxytitanium dimethacrylate, isopropoxytitanium trimethacrylate, triisopropoxytitanium hexanoate, triisopropoxytitanium stearate, and the like.

The following compounds, for example, can be used as halogenated titanium catalysts: triisopropoxytitanium chloride, diisopropoxytitanium dichloride, isopropoxytitanium trichloride, triisopropoxytitanium bromide, triisopropoxytitanium fluoride, triethoxytitanium chloride, tributoxytitanium chloride.

Titanium chelate complexes can also be used: dimethoxytitanium bis(ethylacetoacetate), dimethoxytitanium bis (acetylacetonate), diethoxytitanium bis(ethylacetoacetate), diethoxytitanium bis(acetylacetonate), diisopropoxytitanium bis(ethylacetoacetate), diisopropoxytitanium bis(methylacetoacetate), diisopropoxytitanium bis(t-butylacetoacetate), diisopropoxytitanium bis(methyl-3-oxo-4,4-dimethylhexanoate), diisopropoxytitanium bis(ethyl-3-oxo-4,4,4-trifluorobutanoate), diisopropoxytitanium bis(acetylacetonate), diisopropoxytitanium bis(2,2,6,6-tetramethyl-3,5-heptanedionate), di(n-butoxy)titanium bis(ethylacetoacetate), di(n-butoxy)titanium bis(acetylacetonate), diisobutoxytitanium bis(ethylacetoacetate), diisobutoxytitanium bis(acetylacetonate), di(t-butoxy)titanium bis(ethylacetoacetate), di(t-butoxy)titanium bis(acetylacetonate), di(2-ethylhexoxy) titanium bis(ethylacetoacetate), di(2-ethylhexoxy)titanium bis(acetylacetonate), bis(1-methoxy-2-propoxy)titanium bis (ethylacetoacetate), bis(3-oxo-2-butoxy)titanium bis(ethylacetoacetate), bis(3-diethylaminopropoxy)titanium bis (ethylacetoacetate), triisopropoxytitanium (ethylacetoacetate), triisopropoxytitanium (diethylmalonate), triisopropoxytitanium (allylacetoacetate), triisopropoxytitanium (methacryloxyethylacetoacetate), 1,2-dioxyethanetitanium bis(ethylacetoacetate), 1,3-dioxypropanetitanium bis(ethylacetoacetate), 2,4-dioxypentanetitanium bis(ethylacetoacetate), 2,4-dimethyl-2,4-dioxypentanetitanium bis(ethylacetoacetate), diisopropoxytitanium bis(triethanolaminate), tetrakis(ethylacetoacetato)titanium, tetrakis(acetylacetonato)titanium, bis(trimethylsiloxy)titanium bis(ethylacetoacetate), bis(trimethylsiloxy)titanium bis(acetylacetonate).

It is preferred to use the following titanium chelate complexes, because they are commercially obtainable and have a high catalytic activity: diethoxytitanium bis(ethylacetoacetate), diethoxytitanium bis(acetylacetonate), diisopropoxytitanium bis(ethylacetoacetate), diisopropoxytitanium bis(acetylacetonate), dibutoxytitanium bis(ethylacetoacetate), and dibutoxytitanium bis(acetylacetonate).

Diethoxytitanium bis(ethylacetoacetate), diisopropoxytitanium (ethylacetoacetate), and dibutoxytitanium bis(ethylacetoacetate) are particularly preferred; diisopropoxytitanium bis(ethylacetoacetate) is very particularly preferred.

The following titanium catalysts can also be used: isopropoxytitanium tris(dioctylphosphate), isopropoxytitanium tris(dodecyl benzyl sulfonate), dihydroxytitanium bislactate.

Aluminum catalysts can also be used as curing catalysts, for example aluminum alkoxides

where $R^z$ denotes an organic group, preferably a substituted or unsubstituted hydrocarbon residue having 1 to 20 carbon atoms, and the three $R^z$ residues are identical or different.

In the case of the aluminum alkoxides as well, one or more of the alkoxy residues can again be replaced by —OC(O)$R^z$ acyloxy residues.

It is also possible to use aluminum alkoxides in which one or more alkoxy residues are replaced by halogen atoms.

Of the aluminum catalysts described, the pure aluminum alcoholates are preferred in view of their stability with respect to moisture and the hardenability of the mixtures to which they are added. Aluminum chelate complexes are also preferred.

The following compounds, for example, can be used as aluminum alkoxides: trimethoxyaluminum, triethoxyaluminum, triallyloxyaluminum, tri(n-propoxy)aluminum, triisopropoxyaluminum, tri(n-butoxy)aluminum, triisobutoxyaluminum, tri(sec-butoxy)aluminum, tri(t-butoxy)aluminum, tri(n-pentoxy)aluminum, tricyclopentoxyaluminum, trihexoxyaluminum, tricyclohexoxyaluminum, tribenzoxyaluminum, trioctoxyaluminum, tris(2-ethylhexoxy)aluminum, tridecoxyaluminum, tridodecoxyaluminum, tristearoxyaluminum, dimeric tributoxyaluminum, tris(8-hydroxyoctoxy)aluminum, isopropoxyaluminum bis(2-ethyl-1,3-hexandiolate), diisopropoxyaluminum (2-ethyl-1,3-hexanediolate), (2-ethylhexoxy)aluminum bis(2-ethyl-1,3-hexanediolate), bis(2-ethylhexyloxy)aluminum (2-ethyl-1,3-hexanediolate), tris(2-chloroethoxy)aluminum, tris(2-bromoethoxy)aluminum, tris(2-methoxyethoxy)aluminum, tris(2-ethoxyethoxy)aluminum, butoxydimethoxyaluminum, methoxydibutoxyaluminum, butoxydiethoxyaluminum, ethoxydibutoxyaluminum, butoxydiisopropoxyaluminum, isopropoxydibutoxyaluminum, triphenoxyaluminum, tris(o-chlorophenoxy)aluminum, tris(m-nitrophenoxy)aluminum, tris(p-methylphenoxy)aluminum.

Aluminum acylates, for example, can also be used: diisopropoxyaluminum acrylate, diisopropoxyaluminum methacrylate, isopropoxyaluminum dimethacrylate, diisopropoxyaluminum hexanoate, diisopropoxyaluminum stearate.

Aluminum halide compounds can also be used, for example diisopropoxyaluminum chloride, isopropoxyaluminum dichloride, diisopropoxyaluminum bromide, diisopropoxyaluminum fluoride, diethoxyaluminum chloride, dibutoxyaluminum chloride.

Aluminum chelate complexes can also be used as catalysts, for example methoxyaluminum bis(ethylacetoacetate), methoxyaluminum bis(acetylacetonate), ethoxyaluminum bis(ethylacetoacetate), ethoxyaluminum bis(acetylacetonate), isopropoxyaluminum bis(ethylacetoacetate), isopropoxyaluminum bis(methylacetoacetate), isopropoxyaluminum bis(t-butylacetoacetate), dimethoxyaluminum (ethylacetoacetate), dimethoxyaluminum (acetylacetonate), diethoxyaluminum (ethylacetoacetate), diethoxyaluminum (acetylacetonate), diisopropoxyaluminum (ethylacetoacetate), diisopropoxyaluminum (methylacetoacetate), diisopropoxyaluminum (t-butylacetoacetate), isopropoxyaluminum bis(methyl-3-oxo-4,4-dimethylhexanoate), isopropoxyaluminum bis(ethyl-3-oxo-4,4,4-trifluoropentanoate), isopropoxyaluminum bis(acetylacetonate), isopropoxyaluminum bis(2,2,6,6-tetramethyl-3,5-heptanedionate), n-butoxyaluminum bis(ethylacetoacetate), n-butoxyaluminum bis(acetylacetonate), isobutoxyaluminum bis(ethylacetoacetate), isobutoxyaluminum bis(acetylacetonate), t-butoxyaluminum bis(ethylacetoacetate), t-butoxyaluminum bis(acetylacetonate), 2-ethylhexoxyaluminum bis(ethylacetoacetate), 2-ethylhexoxyaluminum bis(acetylacetonate), 1,2-dioxyethanealuminum (ethylacetoacetate), 1,3-dioxypropanealuminum (ethylacetoacetate), 2,4-dioxypentanealuminum (ethylacetoacetate), 2,4-dimethyl-2,4-dioxypentanealuminum (ethylacetoacetate), isopropoxyaluminum bis(triethanolaminate), aluminum tris(ethylacetoacetate), aluminum tris(acetylacetonate), aluminum (acetylacetonate) bis(ethylacetoacetate).

The following aluminum chelate complexes are used in preferred fashion as catalysts, because they are commercially obtainable and exhibit high catalytic activities: ethoxyaluminum bis(ethylacetoacetate), ethoxyaluminum bis(acetylacetonate), isopropoxyaluminum bis(ethylacetoacetate), isopropoxyaluminum bis(acetylacetonate), butoxyaluminun bis(ethylacetoacetate), butoxyaluminun bis(acetylacetonate), dimethoxyaluminum ethylacetoacetate, dimethoxyaluminum acetylacetonate, diethoxyaluminum ethylacetoacetate, diethoxyaluminum acetylacetonate, diisopropoxyaluminum ethylacetoacetate, diisopropoxyaluminum methylacetoacetate, and diisopropoxyaluminum (t-butylacetoacetate).

Ethoxyaluminum bis(ethylacetoacetate), isopropoxyaluminum bis(ethylacetoacetate), butoxyaluminum bis(ethylacetoacetate), dimethoxyaluminum ethylacetoacetate, diethoxyaluminum ethylacetoacetate, and diisopropoxyaluminum ethylacetoacetate are particularly preferred.

Isopropoxyaluminum bis(ethylacetoacetate) and diisopropoxyaluminum ethylacetoacetate are very particularly preferred.

The following aluminum catalysts, for example, can also be used: bis(dioctylphosphato)isopropoxyaluminum, bis(dodecylbenzylsulfonato)isopropoxyaluminum, hydroxyaluminum bislactate.

The following are suitable as zirconium catalysts: tetramethoxyzirconium, tetraethoxyzirconium, tetraallyloxyzirconium, tetra-n-propoxyzirconium, tetraisopropoxyzirconium, tetra-n-butoxyzirconium, tetraisobutoxyzirconium, tetra-(2-butoxy)zirconium, tetra(t-butoxy)zirconium, tetrapentoxy(zirconium), tetracyclopentoxyzirconium, tetrahexoxyzirconium, tetracyclohexoxyzirconium, tetrabenzoxyzirconium, tetraoctoxyzirconium, tetrakis(2-ethylhexoxy) zirconium, tetradecoxyzirconium, tetradodecoxyzirconium, tetrastearoxyzirconium, tetrabutoxyzirconium dimer, tetrakis (8-hydroxyoctoxy)zirconium, zirconium diisopropoxy-bis (2-ethyl-1,3-hexanediolate), zirconium bis(2-ethylhexyloxy) bis(2-ethyl-1,3-hexanediolate), tetrakis(2-chloroethoxy) zirconium, tetrakis(2-bromoethoxy)zirconium, tetrakis(2-methoxyethoxy)zirconium, tetrakis(2-ethoxyethoxy) zirconium, butoxytrimethoxyzirconium, dibutoxydimethoxyzirconium, butoxytriethoxyzirconium, dibutoxydiethoxyzirconium, butoxytriisopropoxyzirconium, dibutoxydiisopropoxyzirconium, tetraphenoxybutane, tetrakis(o-chlorophenoxy)zirconium, tetrakis(m-nitrophenoxy) zirconium, tetrakis(p-methylphenoxy)zirconium, tetrakis(t-rimethylsiloxy)zirconium, diisopropoxyzirconium bis (ethylacetoacetate), diisopropoxyzirconium bis (acetylacetonate), dibutoxyzirconium bis(ethylacetoacetate), dibutoxyzirconium bis(acetylacetonate), triisopropoxyzirconium ethylacetoacetate, triisopropoxyzirconium acetylacetonate, tris(n-butoxy)zirconium ethylacetoacetate, tris(n-butoxy)zirconium acetylacetonate, isopropoxyzirconium tris (ethylacetoacetate), isopropoxyzirconium tris (acetylacetonate), n-butoxyzirconium tris (ethylacetoacetate), n-butoxyzirconium tris (acetylacetonate), n-butoxyzirconium (acetylacetonate) bis (ethylacetoacetate).

It is preferred to use, for example, diethoxyzirconium bis (ethylacetoacetate), diisopropoxyzirconium bis(ethylacetoacetate), dibutoxyzirconium bis(ethylacetoacetate), triispropoxyzirconium (ethylacetoacetate), tris(n-butoxy) zirconium (ethylacetoacetate), isopropoxyzirconium tris (ethylacetoacetate), n-butoxyzirconium tris (ethylacetoacetate), and n-butoxyzirconium (acetylacetonate) bis(ethylacetoacetate).

Very particularly preferably, diisopropoxyzirconium bis (ethylacetoacetate), triispropoxyzirconium (ethylacetoacetate), and isopropoxyzirconium tris(ethylacetoacetate) are used.

Zirconium acylates, for example, can also be used: triisopropoxyzirconium, triisopropoxyzirconium methacrylate, diisopropoxyzirconium dimethacrylate, isopropoxyzirconium trimethacrylate, triisopropoxyzirconium hexanoate, triisopropoxyzirconium stearate, and the like.

The following compounds can be used as halogenated zirconium catalysts: triisopropoxyzirconium chloride, diisopropoxyzirconium dichloride, isopropoxyzirconium trichloride, triisopropoxyzirconium bromide, triisopropoxyzirconium fluoride, triethoxyzirconium chloride, tributoxyzirconium chloride.

Zirconium chelate complexes can also be used: dimethoxyzirconium bis(ethylacetoacetate), dimethoxyzirconium bis (acetylacetonate), diethoxyzirconium bis(ethylacetoacetate), diethoxyzirconium bis(acetylacetonate), diisopropoxyzirconium bis(ethylacetoacetate), diisopropoxyzirconium bis(methylacetoacetate), diisopropoxyzirconium bis(t-butylacetoacetate), diisopropoxyzirconium bis(methyl-3-oxo-4,4-dimethylhexanoate), diisopropoxyzirconium bis(ethyl-3-oxo-4,4,4-trifluorobutanoate), diisopropoxyzirconium bis (acetylacetonate), diisopropoxyzirconium bis(2,2,6,6-tetramethyl-3,5-heptanedionate), di(n-butoxy)zirconium bis (ethylacetoacetate), di(n-butoxy)zirconium bis (acetylacetonate), diisobutoxyzirconium bis (ethylacetoacetate), diisobutoxyzirconium bis (acetylacetonate), di(t-butoxy)zirconium bis (ethylacetoacetate), di(t-butoxy)zirconium bis (acetylacetonate), di(2-ethylhexoxy)zirconium bis (ethylacetoacetate), di(2-ethylhexoxy)zirconium bis (acetylacetonate), bis(1-methoxy-2-propoxy)zirconium bis (ethylacetoacetate), bis(3-oxo-2-butoxy)zirconium bis (ethylacetoacetate), bis(3-diethylaminopropoxy)zirconium bis(ethylacetoacetate), triisopropoxyzirconium (ethylacetoacetate), triisopropoxyzirconium (diethylmalonate), triisopropoxyzirconium (allylacetoacetate), triisopropoxyzirconium (methacryloxyethylacetoacetate), 1,2-dioxyethanezirconium bis(ethylacetoacetate), 1,3-dioxypropanezirconium bis(ethylacetoacetate), 2,4-dioxypentanezirconium bis(ethylacetoacetate), 2,4-dimethyl-2,4-dioxypentanezirconium bis (ethylacetoacetate), diisopropoxyzirconium bis (triethanolaminate), tetrakis(ethylacetoacetato)zirconium, tetrakis(acetylacetonato)zirconium, bis(trimethylsiloxy)zirconium bis(ethylacetoacetate), bis(trimethylsiloxy)zirconium bis(acetylacetonate).

The following zirconium chelate complexes are preferred for use because they are commercially obtainable and have a high catalytic activity: diethoxyzirconium bis(ethylacetoacetate), diethoxyzirconium bis(acetylacetonate), diisopropoxyzirconium bis(ethylacetoacetate), diisopropoxyzirconium bis(acetylacetonate), dibutoxyzirconium bis (ethylacetoacetate) and dibutoxyzirconium bis (acetylacetonate).

Diethoxyzirconium bis(ethylacetoacetate), diisopropoxyzirconium (ethylacetoacetate), and dibutoxyzirconium bis(ethylacetoacetate) are particularly preferred; diisopropoxyzirconium bis(ethylacetoacetate) is very particularly preferred.

The following zirconium catalysts can also be used: isopropoxyzirconium tris(dioctylphosphate), isopropoxyzirconium tris(dodecyl benzyl sulfonate), dihydroxyzirconium bislactate.

Carboxylic acid salts of metals, or a mixture of multiple such salts, can furthermore be employed as hardening catalysts, these being selected from the carboxylates of the following metals: calcium, vanadium, iron, titanium, potassium, barium, manganese, nickel, cobalt, and/or zirconium.

Of the carboxylates, the calcium, vanadium, iron, titanium, potassium, barium, manganese, and zirconium carboxylates are preferred because they have a high activity.

Calcium, vanadium, iron, titanium, and zirconium carboxylates are particularly preferred.

Iron and titanium carboxylates are very particularly preferred.

The following compounds, for example, can be used: iron (II) (2-ethylhexanoate), iron(III) (2-ethylhexanoate), titanium(IV) (2-ethylhexanoate), vanadium(III) (2-ethylhexanoate), calcium(II) (2-ethylhexanoate), potassium 2-ethylhexanoate, barium(II) (2-ethylhexanoate), manganese (II) (2-ethylhexanoate), nickel(II) (2-ethylhexanoate), cobalt (II) (2-ethylhexanoate), zirconium(IV) (2-ethylhexanoate), iron(II) neodecanoate, iron(III) neodecanoate, titanium(IV) neodecanoate, vanadium(III) neodecanoate, calcium(II) neodecanoate, potassium neodecanoate, barium(II) neodecanoate, zirconium(IV) neodecanoate, iron(II) oleate, iron (III) oleate, titanium tetraoleate, vanadium(III) oleate, calcium(II) oleate, potassium oleate, barium(II) oleate, manganese(II) oleate, nickel(II) oleate, cobalt(II) oleate, zirconium(IV) oleate, iron(II) naphthenate, iron(III) naphthenate, titanium(IV) naphthenate, vanadium(III) naphthenate, calcium dinaphthenate, potassium naphthenate, barium dinaphthenate, manganese dinaphthenate, nickel dinaphthenate, cobalt dinaphthenate, zirconium(IV) naphthenate.

In terms of catalytic activity, iron(II) 2-ethylhexanoate, iron(III) 2-ethylhexanoate, titanium(IV) 2-ethylhexanoate, iron(II) neodecanoate, iron(III) neodecanoate, titanium(IV)

neodecanoate, iron(II) oleate, iron(III) oleate, titanium(IV) oleate, iron(II) naphthenate, iron(III) naphthenate, and titan (IV) naphthenate are preferred, and iron(III) 2-ethylhexanoate, iron(III) neodecanoate, iron(III) oleate, and iron(III) naphthenate are particularly preferred.

The following are preferred in terms of the nonoccurrence of discolorations: titanium(IV) 2-ethylhexanoate, calcium(II) 2-ethylhexanoate, potassium 2-ethylhexanoate, barium(II) 2-ethylhexanoate, zirconium(IV) 2-ethylhexanoate, titanium (IV) neodecanoate, calcium(II) neodecanoate, potassium neodecanoate, barium(II) neodecanoate, zirconium(IV) neodecanoate, titanium(IV) oleate, calcium(II) oleate, potassium oleate, barium(II) oleate, zirconium(IV) oleate, titanium(IV) naphthenate, calcium(II) naphthenate, potassium naphthenate, barium(II) naphthenate, and zirconium(IV) naphthenate.

The calcium carboxylates, vanadium carboxylates, iron carboxylates, titanium carboxylates, potassium carboxylates, barium carboxylates, manganese carboxylates, nickel carboxylates, cobalt carboxylates, and zirconium carboxylates can be used, individually or as a mixture of several catalysts from one or more of the aforementioned groups. These metal carboxylates can furthermore be used in conjunction with tin carboxylates, lead carboxylates, bismuth carboxylates, and cerium carboxylates.

The catalyst is used, if applicable, in a quantity from 0.01 to approximately 1 wt %, based on the total weight of the composition.

Mixtures of several catalysts can also be used in order to combine advantageous effects.

Fillers suitable for the composition according to the present invention are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, wood chips, chopped straw, chaff, ground walnut shells, and other chopped fibers. Short fibers such as glass fibers, glass filament, polyacrylonitrile, carbon fibers, Kevlar fibers, or also polyethylene fibers can also be added. Aluminum powder is likewise suitable as a filler.

Further suitable as fillers are hollow spheres having a mineral shell or a plastic shell. These can be, for example, hollow glass spheres that are obtainable commercially under the trade names Glass Bubbles®. Plastic-based hollow spheres, e.g. Expancel® or Dualite®, are described e.g. in EP 0 520 426 B1. They are made up of inorganic or organic substances and each have a diameter of 1 mm or less, preferably 500 µm or less.

Fillers that impart thixotropy to the preparations are preferred for many applications. Such fillers are also described as rheological adjuvants, e.g. hydrogenated castor oil, fatty acid amides, or swellable plastics such as PVC. In order to be readily squeezable out of a suitable dispensing apparatus (e.g. a tube), such compositions possess a viscosity from 3000 to 15,000, preferably 4,000 to 8,000 mPas, or also 5,000 to 6,000 mPas.

The fillers are used by preference in a quantity from 1 to 80 wt %, based on the total weight of the composition. A single filler or a combination of multiple fillers can be used.

In a specific embodiment of the composition according to the present invention, the filler is a highly dispersed silicic acid having a BET surface area form 10 to 90 $m^2/g$, in particular from 35 to 65 $m^2/g$. When a silicic acid of this kind is used, it produces no substantial increase in the viscosity of the composition according to the present invention, but does contribute to strengthening the hardened preparation. This strengthening improves, for example, the initial strength values, tensile shear strength, and adhesion of the adhesives, sealants, or coating materials in which the composition according to the present invention is used.

A highly dispersed silicic acid having a BET surface area from 45 to 55 $m^2/g$, in particular having a BET surface area of approximately 50 $m^2/g$, is particularly preferred. Such silicic acids have the additional advantage of an incorporation time shortened by 30 to 50% as compared with silicic acids having a higher BET surface area. A further advantage is the fact that the aforesaid highly dispersed silicic acid can be incorporated into adhesives, sealants, or coating materials based on silane-modified polymers at a considerably higher concentration without impairing the transparency and flow properties of the adhesives, sealants, or coating materials.

A further specific embodiment of the present invention is a composition according to the present invention in which the filler is a highly dispersed silicic acid having an average particle size $d_{50}$, measured by laser diffraction, of less than 25 µm, preferably from 5 to 20 µm. A filler of this kind is particularly well suited when highly transparent, clear compositions are required for particularly demanding applications.

It is likewise conceivable to use pyrogenic and/or precipitated silicic acids having a higher BET surface area, advantageously 100 to 250 $m^2/g$, in particular 110 to 170 $m^2/g$, as a filler. The incorporation of such silicic acids does, however, take a comparatively long time and is thus more cost-intensive. In addition, considerable quantities of air are introduced into the product, and must in turn be laboriously and tediously removed. On the other hand, because of the greater BET surface area, the effect of strengthening the hardened preparation is achieved with a smaller weight proportion of silicic acid. Further substances can thus be introduced in order to improve the preparation according to the present invention in terms of other requirements.

The composition according to the present invention can furthermore contain antioxidants. The proportion of antioxidants in the composition according to the present invention is by preference up to approximately 7 wt %, in particular up to approximately 5 wt %.

The preparation according to the present invention can furthermore contain UV stabilizers. The proportion of UV stabilizers in the composition according to the present invention is by preference up to approximately 2 wt %, in particular approximately 1 wt %. The so-called hindered amine light stabilizers (HALS) are particularly suitable as UV stabilizers. It is preferred in the context of the present invention if a UV stabilizer that carries a silyl group, and that is incorporated into the end product upon crosslinking or curing, is used. The products Lowilite 75, Lowilite 77 (Great Lakes company, USA) are particularly suitable for this purpose. Benzotriazoles, benzophenones, benzoates, cyanoacrylates, acrylates, sterically hindered phenols, phosphorus, and/or sulfur can also be added.

It is often useful to stabilize the preparations according to the present invention further with regard to penetrating moisture by means of drying agents, in order to enhance shelf life even further.

Such improvement in shelf life can be achieved, for example, with the use of drying agents. Suitable as drying agents are all compounds that react with water to form a group that is inert with respect to the reactive groups present in the preparation, and in that context experience as little change as possible in their molecular weight. In addition, the reactivity of the drying agent with respect to moisture that has penetrated into the preparation must be greater than the reactivity of the terminal groups of the silyl-group-carrying polymers according to the present invention that are present in the preparation.

Isocyanates, for example, are suitable as drying agents.

Advantageously, silanes are also used as a drying agent, for example vinylsilanes such as 3-vinylpropyltriethoxysilane, oximosilanes such as methyl-O,O',O"-butan-2-onetrioximosilane or O,O',O",O"'-butan-2-onetetraoximosilane (CAS nos. 022984-54-9 and 034206-40-1) or benzamidosilanes such as bis(N-methylbenzamido)methylethoxysilane (CAS no. 16230-35-6) or carbamatosilanes such as carbamatomethyltrimethoxysilane. The use of methyl-, ethyl- or vinyltrimethoxysilane, tetramethyl- or -ethylethoxysilane is, however, also possible. Vinyltrimethoxysilane and tetraethoxysilane are particularly preferred here in terms of efficiency and cost.

The aforementioned further reactive diluents are likewise suitable as drying agents, provided they have a molecular weight (Mn) of less than approximately 5000 g/mol and possess terminal groups whose reactivity with respect to moisture that has penetrated is at least as great as, preferably greater than, the reactivity of the reactive groups of the silyl-group-carrying polymer according to the present invention.

Lastly, alkyl orthoformates or alkyl orthoacetates can also be used as drying agents, for example methyl or ethyl orthoformate, methyl or ethyl orthoacetate.

The composition according to the present invention contains, if applicable, approximately 0.01 to approximately 10 wt % drying agent.

In a further preferred embodiment of the composition according to the present invention, the latter contains
3 to 50 wt % of at least one silane-modified polyether A,
5 to 50 wt % of at least one silane-terminated polymer B,
0 to 65 wt % of a filler,
0 to 40 wt % of a plasticizer,
0.1 to 10 wt % of an adhesion promoter,
0.01 to 1 wt % of a hardening catalyst,
and 0 to 10 wt % of further adjuvants such as pigments, stabilizers, UV absorbers, aging protection agents, antioxidants, rheological adjuvants, diluents resp. reactive diluents, as well as fungicides and flame retardants, the proportions of the ingredients adding up to 100 wt % and being based in each case on the total weight of the composition.

A further subject of the present invention is a method for manufacturing a solvent-free and anhydrous hardenable composition, wherein at least one polymer A is manufactured by reacting a polyether with at least one ethylenically unsaturated silane that carries at least one hydrolyzable group on the silicon atom, in the presence of a radical starter, and
the polymer thus obtained is mixed with the further constituent(s) of the composition.

Before reacting, the polyether is preferably dried at a temperature of at least 60° C., preferably at least 70° C., for at least 40 minutes and then heated to a temperature of at least 100° C., preferably at least 130° C.

Addition of the ethylenically unsaturated silane(s) occurs by preference at a temperature of at least 50° C., particularly preferably at least 70° C., and in particular more than 90° C.

A further subject of the invention is the use of a hardenable composition according to the present invention, or a composition manufactured in accordance with the method according to the present invention described above, as an adhesive, sealant, or coating material. The composition exhibits a broad adhesion spectrum. Use as an adhesive for adhesive bonding of plastics, metals, glass, ceramics, wood, wood materials, paper, paper materials, rubber, and textiles is preferred. For such applications, the composition according to the present invention is easy to process and apply because of its low viscosity, and enables good adhesion and strength after curing. In addition, a composition according to the present invention advantageously has good extensibility simultaneously with high breaking strength.

In principle, all features set forth in the context of the present text, in particular the embodiments, proportion ranges, constituents, and other features identified as preferred and/or special, of the composition according to the present invention, of the method according to the present invention, and of the use according to the present invention can be realized in all possible combinations that are not mutually exclusive.

EXAMPLES

Manufacture of Polymer A-General Procedure:

80 g of a polypropylene glycol is dried for one hour at 80° C. and then heated to 150° C. At a temperature of 100° C., 20 g vinylsilane and 0.5 to 2 g radical starter (e.g. dicumyl peroxide) are added. After complete reaction of the radical starter, stirring is continued for 2 hours, the mixture has stabilizers added to it, and is decanted and sealed in airtight fashion.

Manufacture of Polymer B1:

282 g (15 mmol) polypropylene glycol 18000 (OH number=6.0) was dried under vacuum at 100° C. in a 500-ml three-neck flask. 0.1 g catalyst was added at 80° C. under a nitrogen atmosphere, and 7.2 g (32 mmol) 3-isocyanatopropyltrilmethylsiloxane (NCO content=18.4%) was then added. After one hour of stirring at 80° C., the resulting polymer was cooled and then had 6 g vinyltrimethoxysilane added to it. The product was stored in moisture-tight fashion under a nitrogen atmosphere in a glass vessel. The viscosity is equal to 28,425 mPas.

Manufacture of Polymer B2:

280 g (35 mmol) polypropylene glycol 8000 (OH number=13.6) and 0.6 g (4.5 mmol) ethylhexanol are dried under vacuum at 80° C. in a 500-ml three-neck flask. 0.07 g dibutyltin di laurate is added at 80° C. under a nitrogen atmosphere. 4.6 g (27 mmol) tetramethylxylylene diisocyanate (TMXDI) is then added; after one hour of stirring, 4.4 g (21 mmol) isocyanatopropyltrimethoxysilane (% NCO=19.6%) is then added, and stirring continues for another hour at 80° C. The resulting prepolymer mixture is cooled and then has 6 g vinyltrimethoxysilane added to it. The product is stored in moisture-tight fashion under a nitrogen atmosphere in a glass vessel before being further processed, in accordance with the general procedure, into a hardenable preparation. The viscosity is equal to 208,000 mPas.

Manufacture of polymer B3:

260 g (65 mmol) polypropylene glycol 4000 (OH number=28) is dried under vacuum at 80° C. in a 500-ml three-neck flask. 0.07 g dibutyltin di laurate is added at 80° C. under a nitrogen atmosphere. 19 g (86.5 mmol) IPDI is then added. Once the calculated NCO value is reached, 11 g (47.5 mmol) Dynasilan 1189 is added, and stirring continues for another hour at 80° C. The resulting prepolymer mixture is cooled and then has 5.0 g vinyltrimethoxysilane added. The product is stored in moisture-tight fashion under a nitrogen atmosphere in a glass vessel before being further processed, in accordance with the general procedure, into a hardenable preparation. The viscosity is equal to 45,425 mPas.

Polymers B were manufactured in a high-speed mixer, e.g. a SpeedMixer DAC 400 FVZ (Hauschild Engineering). Firstly the liquid components were mixed (without a crosslinking catalyst), then the filler was added, and then the catalyst was mixed in.

The results are summarized in Table 1 (unless otherwise identified, indications are in wt % based on the total weight of the composition).

Determination of Viscosity:

The viscosity values were determined using a Brookfield RVDV-II+ viscosimeter, spindle 7, 100 rpm, at 23° C.

TABLE 1

| | Example no. | | | | | | | |
|---|---|---|---|---|---|---|---|---|
| | 1 (comp.) | 2 | 3 | 4 | 5 | 6 | 7 | 8 |
| Polymer A | | 28.0 | 28.0 | 28.0 | 28.0 | 28.0 | 28.0 | 28.0 |
| PPG (molar weight, quantity) | | 12,000, 80 g | 12,000, 80 g | 12,000, 80 g | 12,000, 80 g | 12,000, 80 g | 12,000, 80 g | 18,000, 80 g |
| Vinylsilane Geniosil | | 20 g XL 10 | 20 g XL 10 | 20 g XL 10 | 5 g XL 10 | 20 g XL 10 | 20 g XL 12 | 20 g XL 10 |
| Dicumyl peroxide | | 2 g | 1 g | 0.5 g | 0.1 g | 0.1 g | 2 g | 0.5 g |
| Viscosity Polymer A (mPas) | | 1720 | 2480 | 3320 | 6080 | 3280 | 880 | 3400 |
| Polymer B1 (per manufacturing example) | 28.0 | | | | | | | |
| Diisoundecyl phthalate | 12.5 | 12.5 | 12.5 | 12.5 | 12.5 | 12.5 | 12.5 | 12.5 |
| Calcium carbonate (Omyabond 302) | 57.0 | 57.0 | 57.0 | 57.0 | 57.0 | 57.0 | 57.0 | 57.0 |
| Aminopropyltrimethoxy-silane | 1.0 | 1.0 | 1.0 | 1.0 | 1.0 | 1.0 | 1.0 | 1.0 |
| Vinyltrimethoxysilane | 1.4 | 1.4 | 1.4 | 1.4 | 1.4 | 1.4 | 1.4 | 1.4 |
| Dibutyltin di laurate | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 |
| Results | | | | | | | | |
| SOT (min) | 20 | 25 | 23 | 25 | 18 | 17 | Overnight | 25 |
| Breaking strength (N/mm$^2$) | 2.55 | 1.79 | 2.37 | 1.99 | soft | 1.34 | 0.52 | 2.9 |
| Elongation at fracture (%) | 111 | 12 | 19 | 19 | | 32 | 26 | 40 |
| E-100 (N/mm$^2$) | 2.53 | | | | | | | |

| | Example no. | | | | | | |
|---|---|---|---|---|---|---|---|
| | 1 (comp.) | 9 | 10 | 11 | 12 | 13 | 14 |
| Polymer A | | 14.0 | 14.0 | 14.0 | 14.0 | 14.0 | 14.0 |
| Polymer B (per manufacturing example) | 28.0 | B1 14.0 | B1 14.0 | B1 14.0 | B1 14.0 | B1 14.0 | B1 14.0 |
| Viscosity (mPas) (polymer mixture) | 28,425 | 9800 | 10,000 | 11,000 | 13,250 | 10,125 | 8800 |
| Diisoundecyl phthalate | 12.5 | 12.5 | 12.5 | 12.5 | 12.5 | 12.5 | 12.5 |
| Calcium carbonate (Omyabond 302) | 57.0 | 57.0 | 57.0 | 57.0 | 57.0 | 57.0 | 57.0 |
| Aminopropyltrimethoxy-silane | 1.0 | 1.0 | 1.0 | 1.0 | 1.0 | 1.0 | 1.0 |
| Vinyltrimethoxysilane | 1.4 | 1.4 | 1.4 | 1.4 | 1.4 | 1.4 | 1.4 |
| Dibutyltin di laurate | 0.1 | 0.1 | 0.1 | 0.1 | 0.1 | 0.1 | 0.1 |
| Total | 100.0 | 100.0 | 100.0 | 100.0 | 100.0 | 100.0 | 100.0 |
| Results | | | | | | | |
| SOT (min) | 20 | 20 | 20 | 20 | 18 | 18 | 35 |
| Breaking strength (N/mm$^2$) | 2.55 | 2.82 | 2.87 | 2.63 | 2.12 | 2.50 | 2.78 |
| Elongation at fracture (%) | 111 | 65 | 76 | 87 | 198 | 119 | 221 |
| E-100 (N/mm$^2$) | 2.53 | | | | 1.58 | 2.30 | 1.96 |
| E-200 (N/mm$^2$) | | | | | 2.30 | | 2.77 |

| | Example no. | | | | | |
|---|---|---|---|---|---|---|
| | 15 (comp) | 16 (comp) | 17 (comp) | 18 | 19 | 20 |
| Polymer A | 0 | 0 | 0 | 49.45 | 49.45 | 49.45 |
| Polymer B (per manufacturing example) | B1 98.9 | B2 98.9 | B3 98.9 | B1 49.45 | B2 49.45 | B3 49.45 |
| Viscosity (mPas) | 28,425 | 208,000 | 45,145 | 10,280 | 34,800 | 11,210 |
| Aminopropyltrimethoxysilane | 1.0 | 1.0 | 1.0 | 1.0 | 1.0 | 1.0 |
| Dibutyltin di laurate | 0.1 | 0.1 | 0.1 | 0.1 | 0.1 | 0.1 |
| Total | 100.0 | 100.0 | 100.0 | 100.0 | 100.0 | 100.0 |

TABLE 1-continued

| Results | | | | | | |
|---|---|---|---|---|---|---|
| SOT (min) | 20 | 22 | 20 | 22 | 24 | 30 |
| Breaking strength (N/mm$^2$) | 0.68 | 0.3 | 0.98 | 0.75 | 0.55 | 0.89 |
| Elongation at fracture (%) | 67 | 192 | 46 | 72 | 80 | 40 |

The Examples show that compositions which contain the silane-modified polyether A have significantly lowered viscosity values and, associated therewith, considerably improved processability. It is furthermore possible to adapt the elastic properties of the composition to the respective requirements over a wide range.

What is claimed is:

1. A solvent-free and anhydrous hardenable composition containing at least one polymer A, polymer A being obtained by reacting a polyether with at least one ethylenically unsaturated silane in the presence of a radical starter, the polyether is a polymer whose repeating units are held together by C—O—C ether functionalities, the ethylenically unsaturated silane carrying at least one hydrolyzable group on the silicon atom.

2. The hardenable composition according to claim 1, wherein polymer A is obtained by reacting a polyether with at least one ethylenically unsaturated silane of the general formula (I)

$$R^1R^2C=C(R^3)-R^4-SiXYZ \quad (I)$$

in which $R^1$, $R^2$, and $R^3$ are identical or different and denote, mutually independently, a hydrogen atom or an alkyl group having 1 to 6 carbon atoms, $R^4$ denotes a chemical bond or a divalent organic group containing 1 to 10 atoms selected from carbon, oxygen, and nitrogen, and X, Y, and Z are identical or different; at least two of the substituents X, Y, and Z are, mutually independently, a methoxy, ethoxy, propyloxy, or butyloxy group; and the remaining substituent is one of the alkoxy groups listed previously, an alkyl group having 1 to 6 carbon atoms, an alkenyl group having 2 to 6 carbon atoms, or an alkenyloxy group having 2 to 6 carbon atoms.

3. The hardenable composition according to claim 2, wherein in the general formula (I), $R^4$ denotes a chemical bond.

4. The hardenable composition according to claim 1, wherein polymer A is obtained by reacting the polyether with 1 to 50 wt %—based on the weight of the polyether—ethylenically unsaturated silane.

5. The hardenable composition according to claim 1, wherein the molecular weight $M_n$ of the polyether is equal to 2000 to 100,000 g/mol.

6. The hardenable composition according to claim 1, wherein the viscosity of each polymer A that is contained is equal to between 300 and 50,000 mPas (Brookfield, 23° C., spindle 7, 100 rpm).

7. The hardenable composition according to claim 1, wherein the maximum polydispersity $M_w/M_n$ of the polyether is equal to 3.

8. The hardenable composition according to claim 1, wherein the composition contains one or more polymer(s) B terminated with at least one reactive silyl group, polymer B being not identical to polymer A.

9. The hardenable composition according to claim 1, wherein a crosslinking catalyst is contained.

10. The hardenable composition according to claim 1, wherein polymer A comprises silyl groups, having at least one hydrolyzable group on the silicon atom, in a statistical distribution.

11. The hardenable composition according to claim 1, wherein the composition contains 3 to 50 wt % of at least one silane-modified polyether A,
5 to 50 wt % of at least one polymer B,
0 to 65 wt % of a filler,
0 to 40 wt % of a plasticizer,
0.1 to 10 wt % of an adhesion promoter,
0.01 to 1 wt % of a hardening catalyst, and
0 to 10 wt % of further adjuvants, the proportions of the ingredients adding up to 100 wt %.

12. A method for manufacturing the solvent-free and anhydrous hardenable composition of claim 1, wherein at least one polymer is manufactured by reacting a polyether, the polyether is a polymer whose repeating units are held together by C—O—C ether functionalities, with at least one ethylenically unsaturated silane that carries at least one hydrolyzable group on the silicon atom, in the presence of a radical starter, and the polymer thus obtained is mixed with the further constituents of the composition.

13. An adhesive or sealant or coating composition comprising the hardenable composition according to claim 1.

* * * * *